United States Patent [19]
Sieverding

[11] Patent Number: 5,495,539
[45] Date of Patent: Feb. 27, 1996

[54] IMAGE PRODUCTION USING MULTIDIMENSIONAL SELECTION OF IMAGE TRANSFORMATIONS

[76] Inventor: David L. Sieverding, 750 Princeton Ave., Steamboat Springs, Colo. 80477

[21] Appl. No.: 116,892

[22] Filed: Sep. 2, 1993

[51] Int. Cl.[6] .................................................. G06K 9/36
[52] U.S. Cl. ............................................ 382/276; 382/302
[58] Field of Search ................................ 382/41, 44, 47, 382/49, 162, 276, 293, 298, 302; 358/518, 523, 527, 537, 540

[56] References Cited

U.S. PATENT DOCUMENTS

| | | | |
|---|---|---|---|
| 4,797,712 | 1/1989 | Hayashi et al. | 355/38 |
| 4,958,221 | 9/1990 | Tsuboi et al. | 358/80 |
| 4,979,031 | 12/1990 | Tsuboi et al. | 358/75 |
| 5,124,788 | 6/1992 | Tsuboi et al. | 358/80 |
| 5,204,736 | 4/1993 | Abe | 358/75 |
| 5,208,911 | 5/1993 | Newman et al. | 395/162 |
| 5,287,418 | 2/1994 | Kishida | 382/50 |

OTHER PUBLICATIONS

Fractal Design ColorStudio Version 1.5 addendum §§5.1–5.19 (user's guide) (no date).
Adobe Photoshop Version 2.5 User's Guide, pp. 121–136. (no date).
ColorStudio User's Guide, Fractal Design Corp., §§8.2–8.19. (no date).
"EFI's Cachet & Fiery," Seybold Report, vol. 7, No. 2, Oct. 1, 1992, pp. 1–12.

*Primary Examiner*—Leo H. Boudreau
*Assistant Examiner*—Andrew W. Johns
*Attorney, Agent, or Firm*—Lorraine S. Hirsch

[57] ABSTRACT

A method for obtaining a printed transformed image first obtains high-resolution data in digitized form, as by electro-optical scanning. The high-resolution data is stored in a computer. The data is processed to a "first approximation" image, and the "first approximation" parameters are stored. A grid with respective loci for the first approximation image and the transformed images is defined. The image is duplicated and scaled to fill each locus in the grid. A first parameterizable image processing function is selected. In a first grid, the images in the "transformed" loci are transformed by degrees according to the first selected function. A second parameterizable image processing function is selected. In a second grid, images in the "transformed" loci are transformed by degrees according to the second selected function. The grid with transformations along the first axis and the grid with transformations along the second axis are presented to the user. One image is chosen from each set in the first and second grids. Chosen transformations are merged, the high-resolution data representing the image is transformed according to the merged transformation, and the final image is printed.

3 Claims, 6 Drawing Sheets

IMAGE PRODUCTION USING MULTIDIMENSIONAL SELECTION OF IMAGE TRANSFORMATIONS

BACKGROUND OF THE INVENTION

This invention relates to image processing and, more particularly, to a process of transforming images to achieve desirable final prints. A major objective of the present invention is to reduce the number of pre-press process iterations and the concomitant degradation of image data.

In image processing, computer data is either converted directly into color negative or positive images or indirectly into color images through a secondary printing process. Direct color imaging includes photographic color imaging, dye sublimation printing, ink jet printing, electrostatic printing and bubble jet printing. Indirect printing includes color offset printing and gravure.

In many direct applications such as conventional gravure and offset printing, a printing plate must be created for each color. The most common way of creating a printing plate is through photographic contact printing using film negatives or positives. In a color offset process the color is created by printing several colored, monochromatic images ("color separations") on top of one another. If transparent ink is used, the overlaying of the different color layers can produce a full-color image. The most common combination of color layers is cyan, magenta, yellow and black, which enables the printer to reproduce visually acceptable full-color images. In a direct method such as ink jet printing, different color layers are applied directly to a substrate. Whether an image is created directly or indirectly, the color separations are frequently created electronically.

It is difficult even for an experienced color separationist to look at an image and set up processing parameters. Because people perceive color comparatively, changing one range of colors in an image can have unintended side effects on the perception of the other ranges of colors in the image. Such complexities often cause a color separationist to misread an image. Often the image must be approved by someone other than the person who performs the on-screen color corrections. In a typical case, the customer has a good idea of the final image he wants, and depends on the image processing service to achieve it. On the other hand, the image processing service would know how to achieve the desired effects if they could be adequately communicated. Since image perception, and especially color perception, is subjective, communication about the desired final image is very difficult. In such a case, a candidate image typically must be printed and sent or shown to the customer for approval. Often the image must be discussed, modified, and reprinted several times before satisfactory colors are achieved. On average, pre-press color separations are redone three times before approval. Because of the communication difficulty and the tremendous range of possible transformations, a customer will often have to travel to a processing house to help with the color separation on-site, at significant cost of money and time.

Moreover, each iteration typically results in irremediable data loss in the conversion from higher precision data to lower. For this reason, images are frequently rescanned, and each iteration adds further to the expense. Typically, a tremendous amount of data is lost between acquisition and output. Most professional quality scanners acquire data at 12 or 16 bits per picture element (pixel) in each color channel, apply electronic image processing to the image, and then map the resulting data to the industry-standard 8 bits per pixel in each color channel at the time it is sent to the computer for storage or to the output scanner for imaging. Each transformation can result in new data loss. For example, if four 8-bit transformations are added, the result is 10 bit data. When this data is re-stored at 8 bits, further data is lost.

An 8-bit-per-channel image breaks down the color data for each of three channels into 256 steps, resulting in 1.68 E+07 possible values. The original 12- or 16-bit-per-channel images contain much more information: A 12-bit-per-channel image contains 4,096 times as many color values as an 8-bit-per-channel image (data is broken into 4,096 steps resulting in 6.87 E+10 possible color values). Similarly, a 16-bit-per-channel image contains 16,777,216 times as many colors as an 8-bit-per-channel image (65,536 steps resulting in 2.81 E+14 color values).

Applying color corrections to data causes irreversible data loss and loss of detail in some portion of the dynamic range of the image. In typical systems, the 8-bit-per channel image is called up on the color separationist's computer monitor, and transformations are performed on that image. When color corrections are applied to low-precision data, such as those in an 8-bit-per-channel image, the relative data loss is greater.

The sequential nature of the color-correction process can also cause the transformations to get channeled into unfortunate directions. An earlier transformation may lead the user to a later transformation that he or she would not otherwise have chosen, in order to harmonize with earlier choices. Furthermore, color correction based on an on-screen display is typically inadequate. Often the user is required to choose sequential transformations from an on-screen display that looks very different from what the printed image will look like. Colors on a glowing monitor do not look like colors on a printed page. Ambient light can wash out the colors on a monitor. To counteract this effect, a user often will darken the room or shroud his monitor and allow his eye to dark-adapt before attempting to edit colors on-screen, but this solution is imperfect at best.

To overcome some of these difficulties, some systems require the user to resort to comparisons between the image he is processing and a standard "reference image" in an attempt to get desired colors. The reference image is a standard image for which sometimes bizarre-appearing screen colors have been mapped to result in acceptable print colors. In theory, if colors in the printed reference image would be acceptable to the user, he can obtain those colors by matching his colors on screen with the screen version of the reference image. However, in practice the reference image is a very limited tool. The user often must compare very dissimilar images, such as an image of two people with an image of a country cottage. It is difficult to predict desirable results with comparisons of such dissimilar images. In any case, the reference image is often a very poor predictor of what the image will look like when printed. Ambient light can wash out the colors in the reference image, making comparison problematic.

What is needed is a color transformation process that allows a user to systematically consider useful candidate transformations from among the billions of possible transformations, and without the necessity of traveling to the pre-press location to aid in color correction. Preferably, the process would enable an acceptable color image to be obtained without expensive and time-consuming iterations of color separations and proofs.

SUMMARY OF THE INVENTION

The present invention provides a desired image from an image source by applying a merged transformation to the latter. The merged transformation combines plural independently selected transformations. Each of the independently selected transformations is a member of a respective set or "family" of transformations. Each of a family of transformations is applied to the original image description; each family of transformations results in a set of images. A person selects one image from each set to arrive at transformations to be combined to yield the merged transformation. Applying the merged transformation to the image source.

As used herein, "image source" encompasses images (which inherently describe themselves), bit-mapped representations of images, and procedural image descriptions (computer-aided design files and PostScript files) and object-based descriptions (some 3-D models). In addition, an image source can include multiple images that are to be blended, as in transparency effects and morphing. "Image transformation" encompasses procedures for obtaining an image from an image description. Image transformations include all transformations by which one image is obtained from another, including an identity transformation in which the result is the same as the original. 3-D model rendering, image-editing, color-correction, scaling, changing contrast and brightness are all image transformations as the term is used herein.

A family of transformations can be generated by stepwise varying a image processing function parameter. For example, the parameter can be the intensity of red in an image. One transformation of a family can reduce the amount of red, another increase the amount of red, and a third can leave the red unchanged.

Typically, different image transformations are applied to the same set of high-precision data, and the results are concurrently displayed. An initial image is transformed stepwise according to one image transformation to create a set of transformed images. The same initial image is also transformed stepwise according to another image processing function to create a second set of transformed images. The steps of each transformation are recorded so that each member of each set can be recreated. The sets of images corresponding to the first and second stepwise transformations are then printed for concurrent display, or otherwise concurrently displayed. Thus, when a customer describes a desired image, the image processing service can apply parallel candidate transformations of the image according to different image processing functions, and can submit them together to the customer. The customer can then select a transformation from each set of test images. The selected transformations are then combined, and the combined transformations applied to the initial image.

In the typical case, each image processing function can be characterized by a parameter with each transformed image corresponding to a value of the parameter. The user can compare images and, for each image processing function of interest, choose an image that represents a value for each parameter to be applied to the final processing.

In a particular application of the method of the present invention, the image is scanned, and the resulting data is preserved in a high-precision, 12-bit- or 16-bit-per-channel format. Logical or intuitive image processing functions, such as increasing or decreasing color saturation, contrast, and/or detail in the midtones, are specified to create a "first approximation" image. These image processing parameters are stored in a computer.

A grid size is then determined. Typically, a sheet of 8 ½"×11" paper is divided into a 3-by-3 grid of 9 images. The image is cropped and/or scaled so that 9 copies can fit into the grid.

A locus is selected for the first approximation image. The first approximation image remains untransformed in each grid of test images (or can be considered to undergo an identity transformation). A selected image processing function is then applied to the other test images. In the usual case, the image processing function will be parameterizable, and the function will be applied to the image in degrees, with each degree corresponding to a value of the parameter. The grid of stepwise transformations is then printed. For example, the top left test image might start out with a contrast reduction. The next test image on the right would have a slightly lower contrast reduction and so forth until the center test image is reached. The center test image is the first approximation image. The test images to the right and below the center image would show relative increases in contrast. This grid would allow the user to pick his or her favorite contrast level by comparing it to other candidate contrast levels. Each displayed contrast level exactly matches the contrast level that will result if the selected transformation were applied to the image, separations made, and the image printed.

Several grids can be printed at a time, each one displaying a different set of test images. For example, one grid can represent overall brightness, one contrast, one overall color balance, and one color saturation. The user can review the grids concurrently to select desired transformations along each axis. The user can juxtapose printed grids to decide whether candidate test images work well together. After a test image from each grid is selected, the selected transformations are merged, and the image with merged transformations is printed.

In the usual case, the customer chooses one test image from each grid. However, the customer can also choose two transformations and request the image processing service to make an intermediate transformation. The customer can also choose to transform different images from the superimage differently, e.g., the sky and the sea (component images in an overall image) can be transformed according to different values of the same parameter. The selected transformations are then merged as above, and the merged transformations can then be printed. Thus, the system can be used to create a transformation map for each class of transformation, including hue correction, dynamic compression, sharpening, blurring, contrast, saturation, and brightness.

DESCRIPTION OF THE PREFERRED EMBODIMENTS

Figure 1:
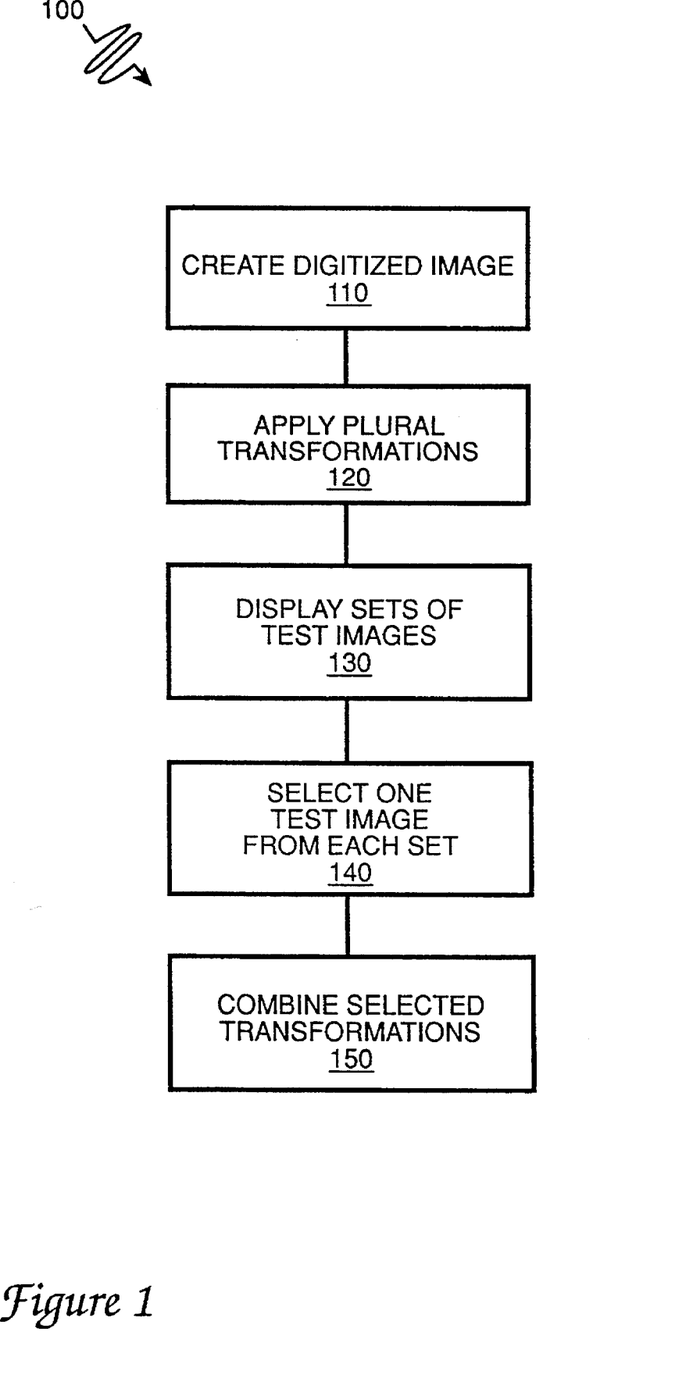
FIG. 1 is a flow chart of a method of the present invention.

A method 100 of the present invention is shown in overview in FIG. 1. A digitized image is created, at a step 110, for example by scanning. Plural sets of transformations corresponding to plural image processing functions are applied to that image, at a step 120. Alternatively, operations can be performed on a series of instructions for generating an image. Typically, each set of transformations has a corresponding parameterizable image processing function. Plural sets of test images are displayed, at a step 130, for example by printing. Each test image corresponds to a value of the parameter for that set of transformations. From the displays, the user can compare transformations and select, at a step 140, a test image from each set. The selected transformations can be merged, at a step 150, to produce a single image with the desired image processing values.

Figure 2:
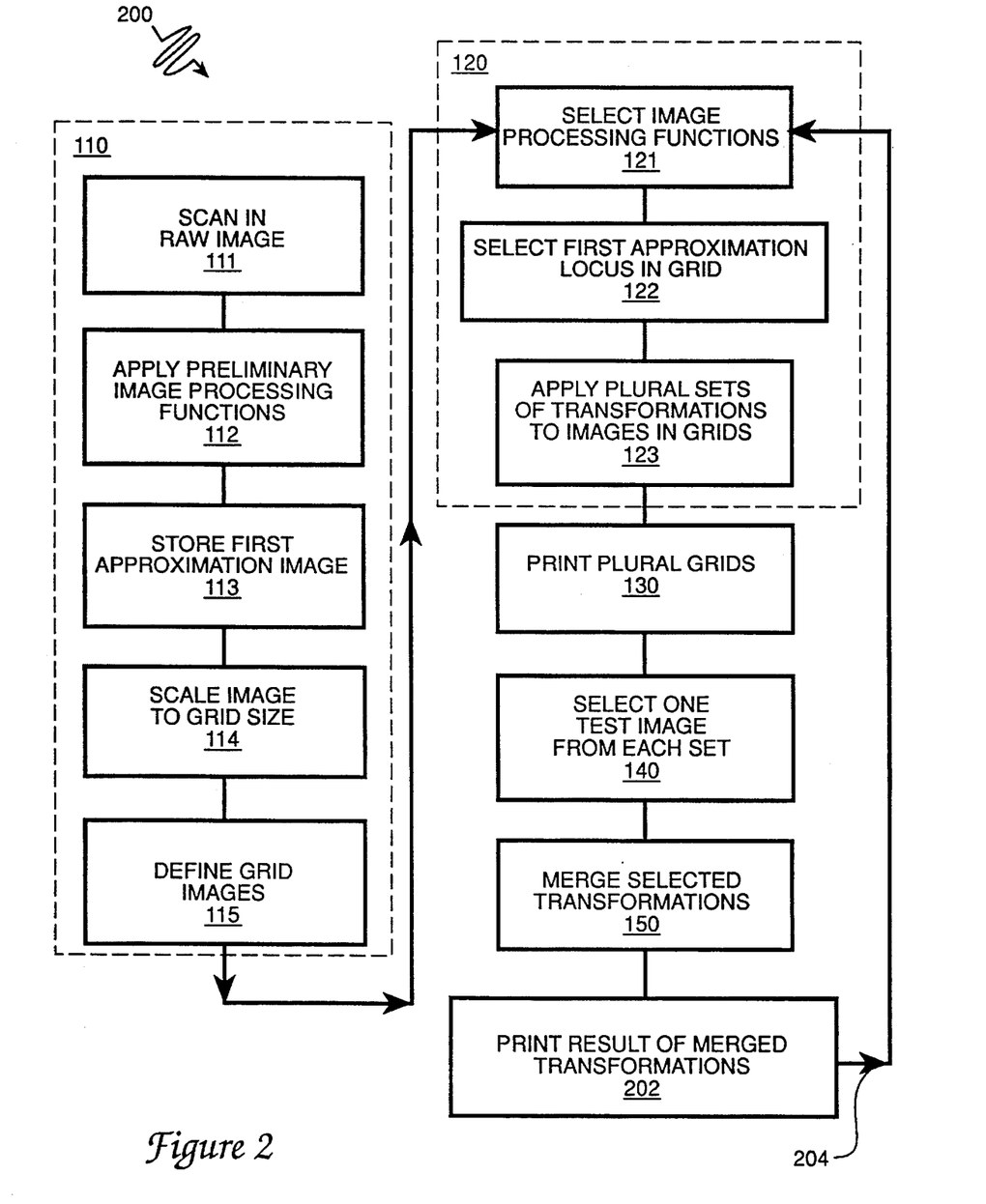
FIG. 2 is a flow chart of the method of FIG. 1, emphasizing pre-press transformations and the application of the invention to print processes.

The steps of method 100 as applied to a print image are shown in more detail in FIG. 2. The processing of an image proceeds as follows. A digitized image is created, at step 110. In the preferred embodiment, the image is created by scanning, at a substep 111, an original photograph or other raw image with an electro-optical scanner. A digitized image can also be created by computer techniques. The data representing the raw image is preferably acquired at 12 or 16 bits per channel. The data in digitized form is then stored in a computer for later retrieval. The raw image is viewed, as for example on a cathode-ray tube (CRT) screen. Initial intuitive or logical image processing functions are selected and are applied, at a substep 112, to the image to obtain a first approximation image. The first approximation image is stored, at a substep 113, in a computer. If the initial high-precision data cannot be recorded as such, the unprocessed data is stored at low precision (e.g., at 8 bits per channel) as the first approximation image.

The first approximation image is scaled to fit a preselected grid size, at a substep 114. In the preferred embodiment, the grid defines nine loci in an 8 ½"-by-11" area, for nine images arranged in a 3-by-3 array. Alternatively, larger or smaller images can be displayed, or fewer or more numerous images, depending on the user's needs. The first approximation image is then duplicated to fill up the grid loci, at a substep 115. The image should be scaled or cropped to fit the grid at an approximately 1:1 data-pixel to printout-pixel ratio. The computer records the location and the transformations so that a specific test image can be recreated.

Transformations are specified at step 120. Transformation specification proceeds as follows. Plural image processing functions for application to the test image are selected, at a substep 121. In the typical case, the image processing functions will be parameterizable. A locus in the grid is selected as the first approximation locus, at a substep 122. Typically, the center of the grid will be selected as the first approximation locus, and will remain untransformed (or can be considered to undergo an identity transformation).

For each selected parameterizable image processing function, duplicated images in other loci in the grid are transformed stepwise. Plural sets of transformations corresponding to the selected functions are applied to the digitized images, at a substep 123. In the preferred embodiment, the central first approximation image is bracketed by one set of transformations. For example, if contrast is being transformed, the contrast of the images to the left and above the first approximation decreases stepwise, while the contrast of the images to the right and below the first approximation image increases stepwise.

Plural sets of test images in the grid are displayed, at step 130. The first approximation image is surrounded by stepwise incremental transformations corresponding to different values of a single parameter. For example, a printed sheet can contain a central first approximation image. Bracketing the central test image are stepwise transformations of a single parameter, allowing the user to concurrently view and to compare the transformations of that parameter. Preferably, each set is an array printed on a single sheet of paper. In this way, stepwise or nonorthogonal transformations are presented concurrently, while arrays of other (orthogonal) transformations can be easily juxtaposed for coordination. For example, one grid containing images of a photo in which green trees have been transformed stepwise can be juxtaposed with a grid containing images of the same photo in which blue sky has been transformed stepwise. The user is thus not forced to choose a green that can then dictate the choice of a coordinating blue. He or she can concurrently compare the blue transformations with the green transformations, and choose harmonious colors.

Plural sheets, each containing a grid, are presented at a time, so that the viewer can concurrently view more than one sets of transformations. The concurrent viewing allows the user to compare images, which takes advantage of the natural abilities of the human eye to distinguish minute variations in visual displays, while eliminating reliance on the limited human ability to describe or predict the desirability of changes in a visual display.

One or more test images from each set are selected, at step 140. In the usual case, only one test image will be selected from each set. However, the user can choose to transform component images differently, and thus select plural transformations from the same grid. For example, using a single sheet of transformed images, the user can select that the sky be the blue it is shown in one locus, and water be the blue it is shown in another locus. The component images need not be separate images with clear boundaries, and in fact need not be spatially defined at all, so long as the portion to be transformed can be defined. For example, all parts of the image that have a certain range of colors can be selected to be transformed. Two images that bracket a desired transformation can also be selected. In the next display, the image will be transformed to values intermediate between the bracketing images.

The selected transformations are merged, at step 150. A gamut-mapping algorithm can be applied to the merged transformation after the selections have been applied but before the corrected image is printed, in order to compensate for the limitations of the output range of colors by mapping to the closest to desired colors. The results of the merged transformations can then be printed, at a step 202, or otherwise displayed. The selection of transformations can be repeated, by taking optional branch path 204, until the desired image is obtained.

Figure 3:
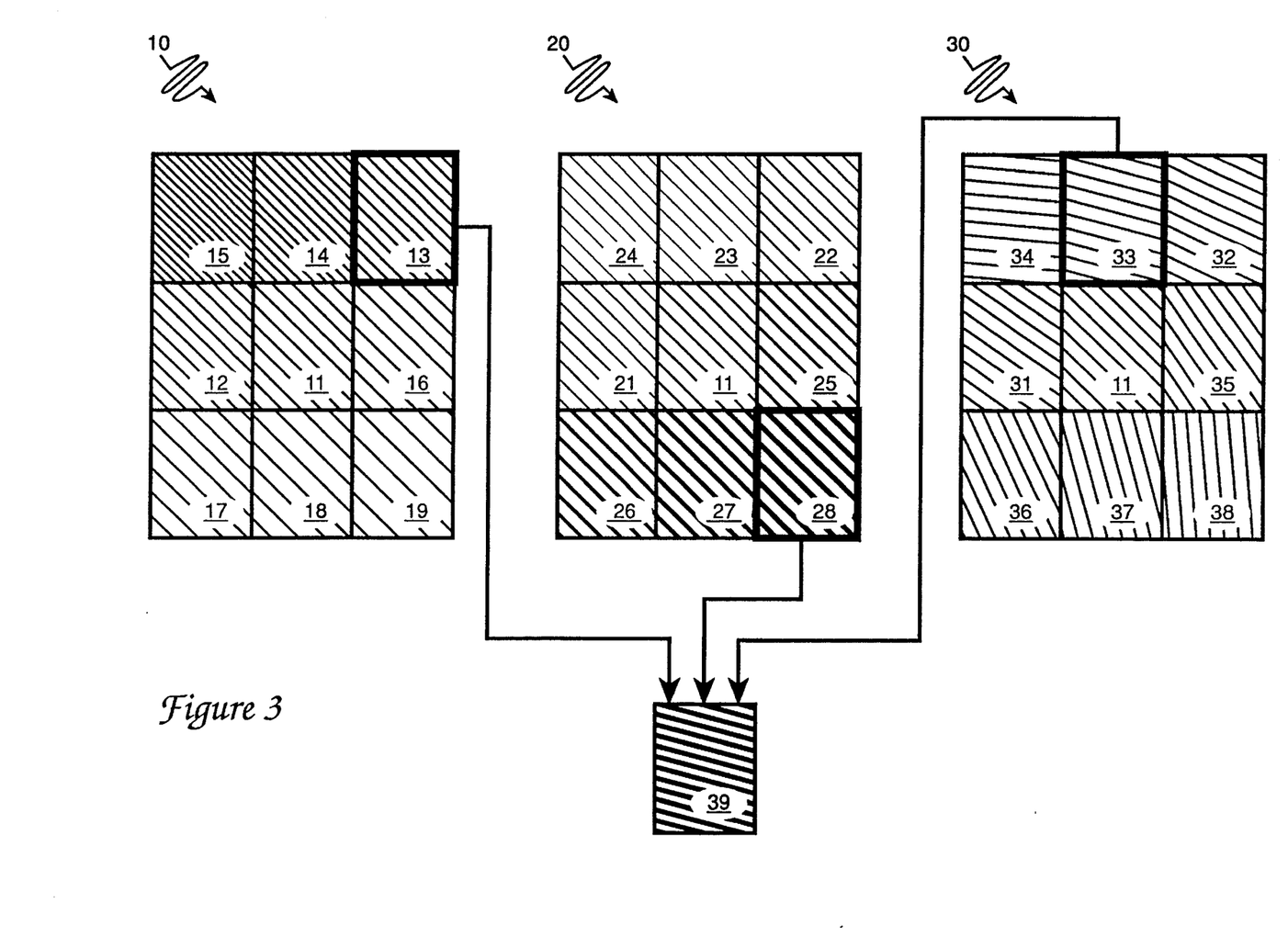
FIG. 3 is a schematic representations of grids, illustrating stepwise transformations of a simple image, and a representation of the merger of selected transformations.

Examples of transformations to illustrate the process are schematically represented in FIG. 3. For simplicity, FIG. 3 shows images in color offset printing transformed according to only three parameters: intensity of cyan in a grid 10, degree of contrast in a grid 20, and intensity of magenta in a grid 30. In the practice of the invention, images may be transformed along many different parameters. FIG. 3 also includes a merged image 39, which illustrates the combination of choices made. Grid 10 of stepwise transformations brackets a first approximation test image 11, as shown in FIG. 3. In grid 10, the amount of space between fill lines in the grid schematically represents the intensity of the color cyan. Small spacing between fill lines corresponds to a less intense cyan and broader spacing corresponds to a more intense cyan. Image 11 represents the first approximation intensity of cyan achieved through intuitive or logical transformations of the raw image. To the left of image 11, an image 12 represents the transformation of the cyan of the first approximation to a less intense cyan. At the top fight locus, an image 13 represents the transformation of image 11 to a less intense cyan than that of image 12. An image 14 transforms the cyan to a still less intense cyan, and an image 15 represents the least intense cyan of grid 10.

To the right of image 11, an image 16 represents the transformation of the cyan of image 11 to a more intense cyan than that of the first approximation image. An image 17 has a still more intense cyan, and an image 18 has a cyan more intense than that of image 17. An image 19 has the most intense cyan of grid 10. In the grid, the cyan intensity of image 13 has been chosen, as represented by the bold border around the image.

Grid 20 represents stepwise transformations of the degree of contrast, as represented in FIG. 3. For example, each input value n from 64 through 191 could be assigned to a new value 128+2·(n−128), i.e. twice as far from 128. Values less than 64 would be assigned to 0 and values greater than 191 would be assigned to 255. (In practice, a smoother function would be used to preserve detail in the high and low ranges.) Different contrast enhancements can be effected by mapping functions with other mid-range slopes greater than 1, and contrast reductions by functions with slopes less than 1.

In grid 20, the width of fill lines schematically represents the degree of contrast. Narrow fill lines correspond to a lesser contrast, while broad fill lines represent a greater contrast. First approximation image 11 again represents the intuitive and logical transformations of the raw data. An image 21 has a lesser contrast than the first approximation, an image 22 has a still lesser contrast, and an image 23 has a lesser contrast than image 22. An image 24 has the least contrast in grid 20. To the fight of first approximation image 11, an image 25 has greater contrast than the first approximation. An image 26 has greater contrast that image 25 and an image 27 still greater contrast. An image 28 has the greatest degree of contrast in grid 20. The transformation represented by image 28 has been selected, as indicated by the bold border around the image.

Similarly, a grid 30 of stepwise transformations of intensity of magenta is depicted in FIG. 3. In grid 30, the slope of fill lines represents the intensity of magenta, with slopes near zero corresponding to a less intense magenta and steeper slopes corresponding to a more intense magenta. First approximation image 11 again represents the intuitive and logical transformations of raw data. Images 31, 32, 33, and 34 represent images of progressively less intensity of magenta, while images 35, 36, 37, and 38 represent images of progressively greater intensity of magenta. The transformation represented by image 33 has been selected, as indicated by the bold border around the image.

Image 39 schematically illustrates the merged selections from grids 10, 20, and 30. Image 39 has the cyan intensity of image 13, the contrast of image 28, and the magenta intensity of image 33.

Figure 4:
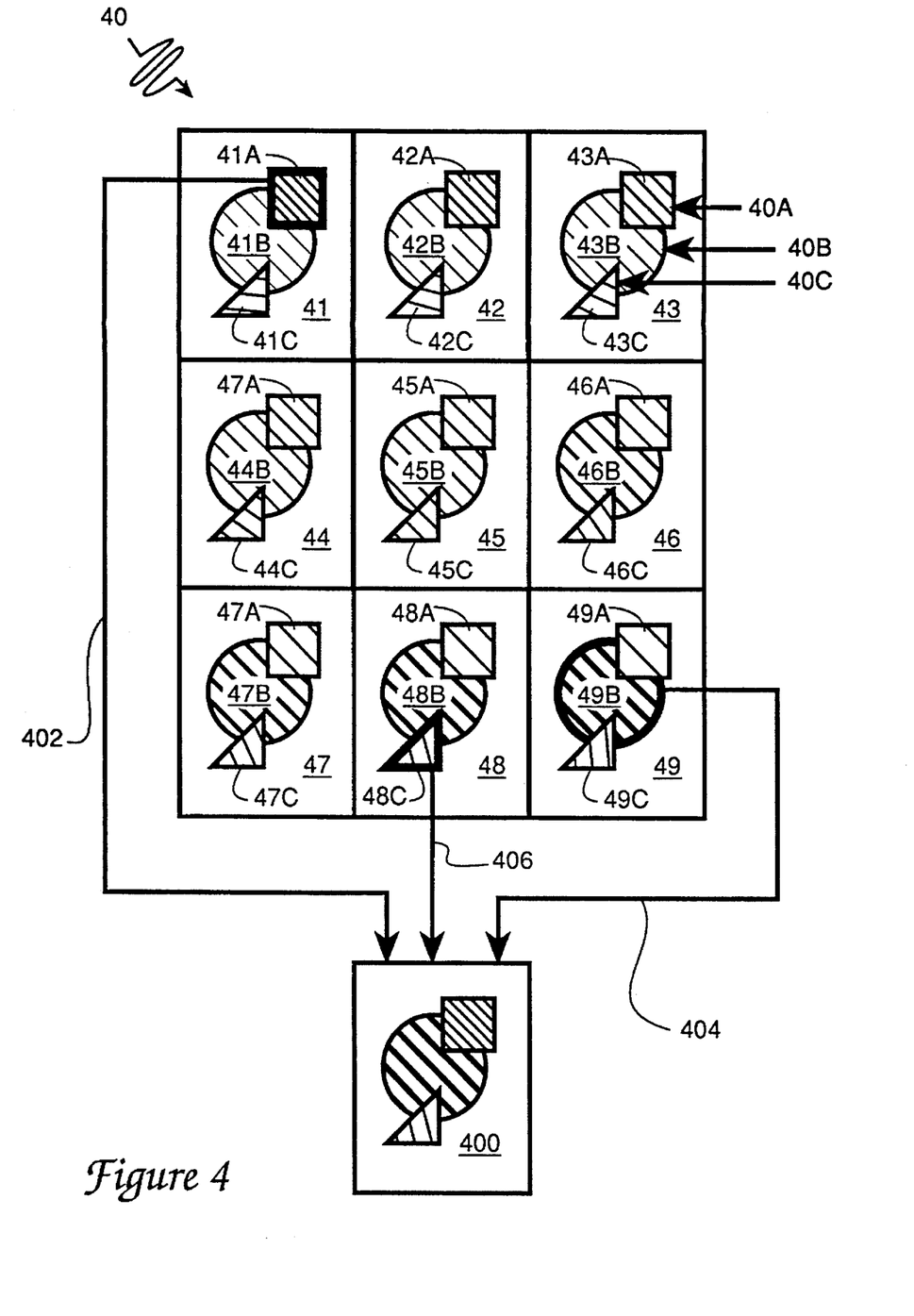
FIG. 4 is a schematic representation of a superarray including superimages, illustrating the parallel display of transformations.

FIG. 4 depicts a superarray containing superimages. As shown in grid 40, each superimage includes preselected component images of a square, circle, and triangle, as illustrated by superimage 41 and square 41A, circle 41B, and triangle 41C. In a case illustrated by FIG. 4, grid 40 contains 3 grids 40A, 40B, and 40C, which can be considered to be displayed in parallel. Grid 40A contains images 41A–49A; grid 40B contains images 41B–49B; and grid 40C contains images 41C–49C.

In FIG. 4, the images have been transformed according to different image processing functions. For simplicity, the images have again been transformed according to only three image processing parameters, intensity of cyan, degree of contrast, and intensity of magenta. In square images 41A–49A, the cyan intensity progressively increases, but degree of contrast and magenta intensity are held constant. In circular images 41B–49B, a the contrast progressively increases, but the intensity of magenta and cyan have been held constant. In triangular images 41C–49C, the intensity of magenta progressively increases while the intensity of cyan and degree of contrast have been held constant.

The customer chooses the A image (the square) preferred from array 41A–49A, the B image (the circle) preferred from array 41B–49B, and the C image (the triangle) preferred from array 41C–49C. In the example depicted in FIG. 4, the customer chooses 41A, 49B, and 48C to create a superimage, as indicated by arrows 402, 404, and 406, respectively, from those images. The customer communicates those selections (41A, 49B, and 48C) to the image processing service, which then merges the selections and produces an image with merged transformations, as illustrated by image 400.

Figure 5:
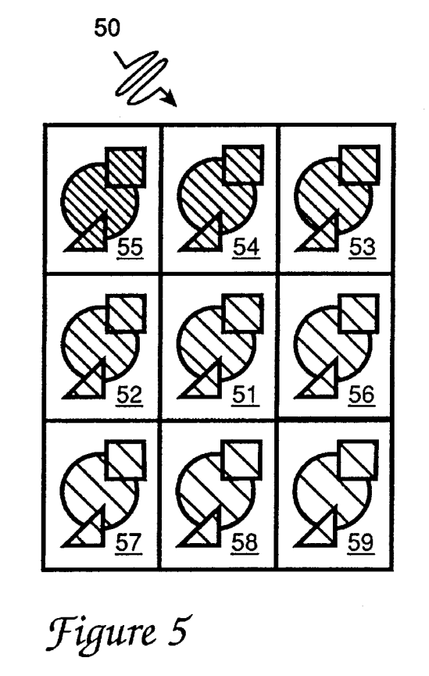
FIGS. 5, 6, and 7 are schematic representations of grids, illustrating stepwise transformations of a superimage and its component images.
Figure 6:
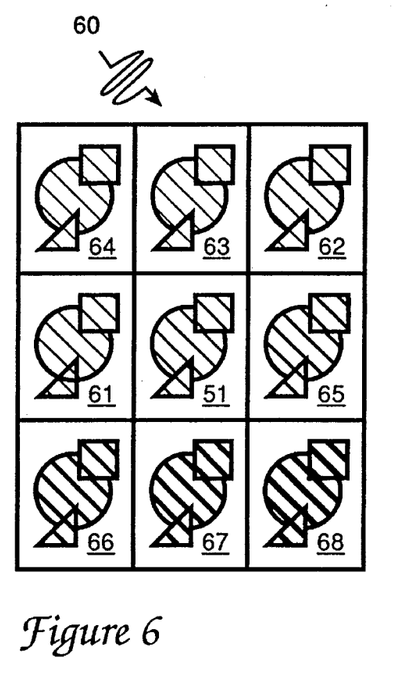
Figure 7:
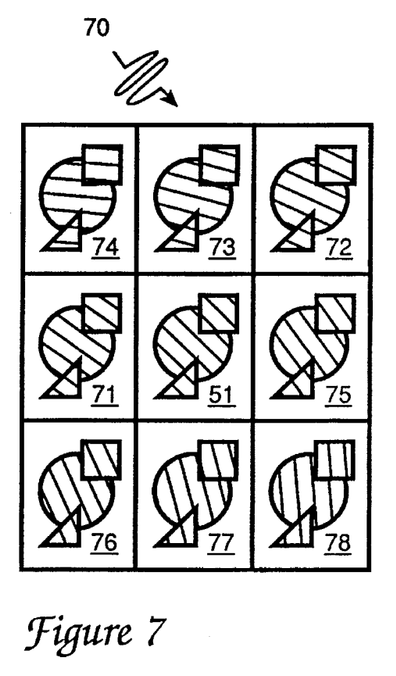
Figure 8:
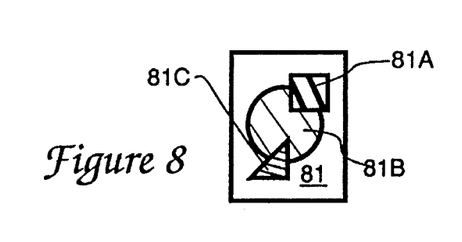
FIG. 8 is a schematic representation of a merged transformation based on selections from the transformations represented in the images of FIGS. 5, 6, and 7.

FIGS. 5, 6 and 7 schematically illustrate the transformation of images and the range of the user's choices of transformations. For simplicity, FIGS. 5, 6, and 7 again show images transformed according to only three parameters: intensity of cyan in a grid 50, degree of contrast in a grid 60, and intensity of magenta in a grid 70. FIG. 8 schematically depicts the merged selected transformations.

In a grid 50, the cyan is transformed stepwise, as schematically shown in FIG. 5. A first approximation superimage 51 is in the first approximation locus in the center of the grid. The image is transformed so that the cyan is progressively decreased, as represented by images 52–55, and intensified, as represented by images 56–59. While the intensity of cyan is varied in the transformations of grid 50, the intensity of magenta and the degree of contrast are held constant.

In a grid 60, the contrast is transformed stepwise, as schematically shown in FIG. 6. First approximation superimage 51 is again in the first approximation locus. In four test images, the degree of contrast is progressively decreased, as represented by images 61, 62, 63, and 64. In test images 65, 66, 67, and 68, the degree of contrast is progressively increased. The intensity of cyan and magenta are held constant throughout grid 60.

In a grid 70, the magenta is transformed stepwise, as schematically shown in FIG. 7. First approximation superimage 51 is again in the first approximation locus. In four test images, the intensity of magenta is progressively decreased, as represented by images 71, 72, 73, and 74. In test images 75, 76, 77, and 78, the intensity of magenta is progressively increased. Note that the intensity of cyan and the degree of contrast are held constant throughout grid 70.

In the example depicted in FIGS. 5, 6, 7, and 8, the user selects images that correspond to desired transformations from the superimages to obtain a desired superimage 81. Alternatively, to provide for greater automation, the image processing service can preselect images to be transformed.

At the customer's request, an image 81A has been transformed to match the appearance of test images 56, 68 and 76. When compared with first approximation image 51, it is seen to have a less intense cyan, more contrast, and a more intense magenta than first approximation 51. An image 81B has been transformed to match the appearance of test images 59, 64, and 75. It has a more intense cyan, less contrast, and a more intense magenta than the first approximation. An image 81C has been transformed to match the appearance of test images 55, 61 and 73. It has a less intense cyan, less contrast, and a less intense magenta than first approximation image 51. The customer's selection of images to be transformed can be implemented in numerous ways, including mapping programs and masking.

Figure 9:
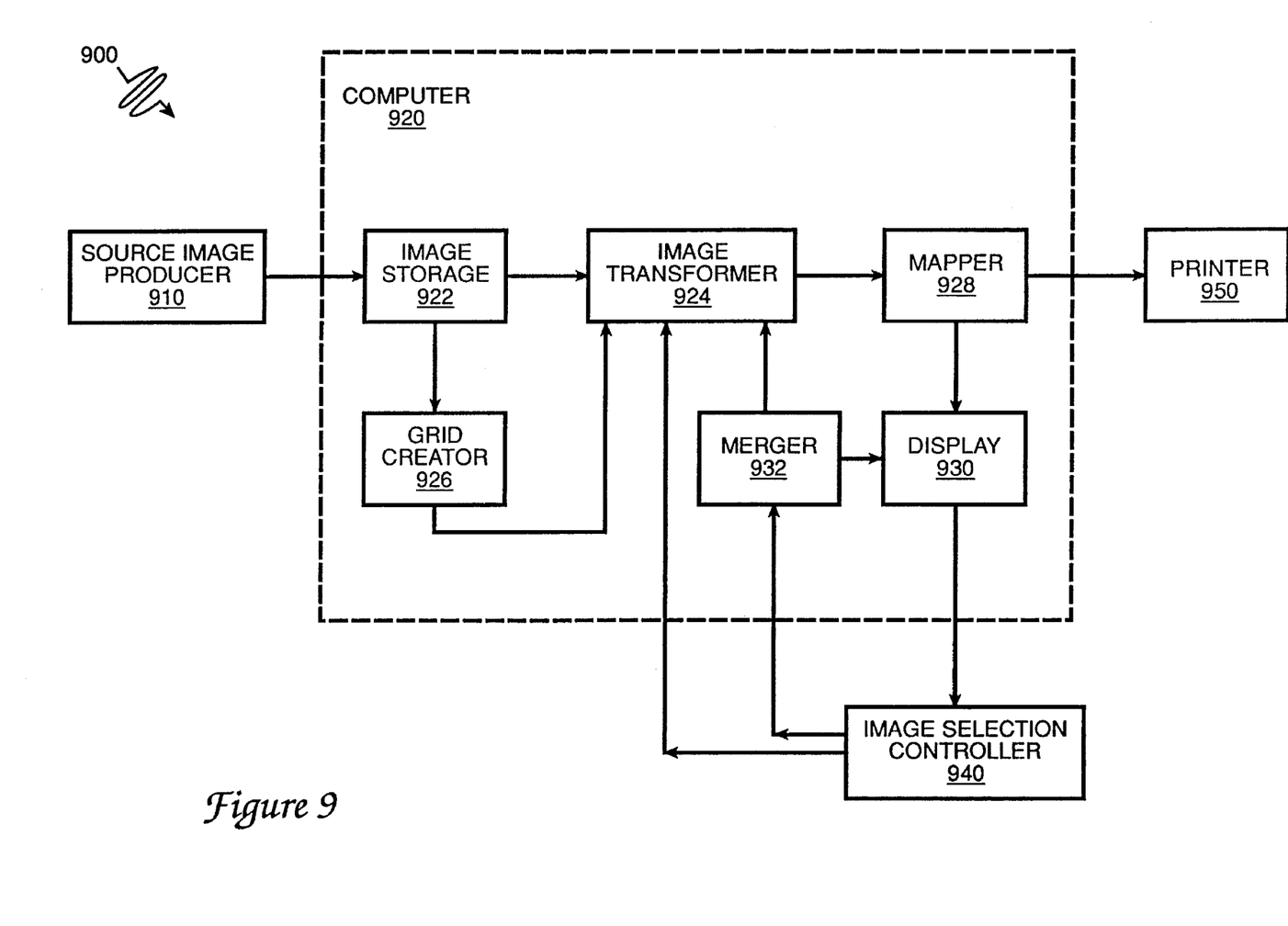
FIG. 9 is a block diagram of the system of the present invention.

An image processing system 900 comprises a source image producer 910, a computer 920, an image selection controller 940, and a printer 950, as shown in FIG. 9. Computer 920 includes the following components: an image storage 922, an image transformer 924, a grid creator 926, a mapper 928, a display 930, and an image transformation merger 932.

Source image producer 910 is a scanner, and produces a digitized source image. The digitized image is transmitted to computer 920. Computer 920 stores the digitized source image in image storage 922. The digitized source image can be sent from storage 922 to image transformer 924. The user selects initial transformations via image selection controller 940. The source image is transformed according to the selected transformations to create a first approximation image.

Mapper 928 maps the first approximation image for viewing on display 930 of computer 920. At his or her selection, the user can also have the image printed by printer 950.

The user then selects parameters by which to transform the first approximation image. Typically, the user will be a color separationist or an image processing service who will choose parameters for transformation based on the customer's description of the kind of image desired, e.g., the customer may request a stark, high contrast image with a dramatic mauve sky. Other parameters may be chosen based on the color separationist's experience and reading of the first approximation image. The user also selects a range of transformation, e.g., contrast intensity from 0 to 15. The range of transformations corresponds to the range of values for the parameter.

Grid creator 926 creates a 3-by-3 array of duplicated first approximation images. Each selected parameter with its associated range of transformations is applied to the first approximation image. Mapper 928 maps the transformations for printing, or alternatively, maps the transformations for viewing on the CRT screen. Typically, when viewing an 8 ½"-by-11" grid of nine images, the intensity of the selected parameter increases from the upper-left-hand image to the lower-right-hand image. The central image in the grid is the untransformed first approximation image.

Plural grids corresponding to plural transformations are sent to printer 950 and printed. The user then sends the sets of printed transformations to the customer, who views the transformations and selects his or her preferences. Alternatively, the user can choose desired transformations.

Typically, one transformation from each set is selected. The user then indicates the selections on the image selection controller, and requests that the transformations be merged. If any of the sets of transformations has been unsatisfactory, the user can respecify the parameters and can create a new set of transformations. When the desired transformations have been selected, the user sends the selections to transformation merger 932 via image selection controller 940. Transformation merger 932 merges the selected transformations, and the image with merged transformations is sent to monitor 930 for review. The image is then printed by printer 950. Alternatively, the image with merged transformations can be sent directly to the printer for printing.

This invention embraces transformations performed on images and other image sources. In the preferred embodiments, images are transformed. "Transformations" further encompasses renderings of vector file images and Postscript images. The transformations can be performed on fractal-generating programs and on renderings of 3-D models. The transformations described throughout this application include color and contrast transformations, spatial operations, convolutions, conditional point operations, intentional addition or subtraction of noise, and conditional spatial operations, and include the identity operation. Image-generating transformations can be binary, as in morphing, blending, double exposure, and transparency transformations where an image is created from two or more source images.

The image processing functions by which images are transformed need not be parameterizable. For example, a logo could be added or positioned differently in each test image in an array. For another example, the subject could be changed in various images in the array, e.g., beginning with an image of a forest and ending with the image of a single tree. Various filters can be applied to the image, and the candidate images printed in an array. The entire process is not limited to color processing, but is compatible with black-and-white image processing. The term "image" as used throughout this application refers to superimages and component images.

Preferably, each array of images is printed on a single sheet. However, plural arrays can be printed on the same sheet. For example, the 3-by-3 grid discussed above can contain a first approximation along with four stepwise transformations along one axis (e.g., blue) and four stepwise transformations along another axis (e.g., contrast).

An array can also be printed on multiple sheets. An array need not be rectangular but can be linear or in another arrangement. An array can be presented on a screen, such as on a CRT screen. All images in an array can be transformed, i.e., there need not be an untransformed (or identity transformed) first approximation image in an array.

The term "print" as used throughout this application is not only limited to printing on paper or film papers, but also includes (but is not limited to) printing on film, negatives, videotape, and cloth, and includes image reproduction on any object or substance that can receive a printed image. Non-visible wavelengths of light can be used in conjunction with the invention, as for instance, imaging using infrared-sensitive film.

The invention is applicable to non-print processes, such as broadcast imaging, computer imaging, and holographic processes. CRT and other screen imaging is specifically contemplated, including circumstances where an image is color-corrected and/or otherwise transformed for direct electronic transmission to one or more CRTs, as on a computer network.

The image may be a digitized reproduction of another image, as when a photograph is scanned to create a digitized image stored in a computer. The image may also be a synthesized image. The image need not be digitized, but can, for example, be optical and analog.

Different component images may be transformed according to different initial or subsequent image processing functions. For example, a user could specify that a particular tree in an overall image of a forest be initialized at a more intense green, or a yellower green, than the other trees. Initial parameters can be set up accordingly. Similarly, the user could specify that in a stepwise transformation, different images be transformed differently. For example, the user could specify that in an array, the yellows in the component tree intensify at twice the rate of the yellows in the surrounding forest.

These and other modifications to and variations upon the described embodiments are provided for by the present invention, the scope of which is limited only by the following claims.

What is claimed is:

1. A method of obtaining a desired image from an image source, said method comprising the steps of:

applying plural transformations to said image source to obtain plural sets of test images, each of said sets including plural test images, one of said sets being printed on one sheet of paper, a second of said sets being printed on another sheet of paper, each of said test images corresponding to a respective one of said transformations;

displaying said test images;

after said step of applying said plural transformations, selecting one test image from each of said sets; and applying a combination of the transformations corresponding to the selected test images to said image source to obtain said desired image.

2. A method of obtaining a desired image, said method comprising the steps of:

obtaining an image source;

applying preliminary image processing functions to said image source to obtain a first approximation image;

storing said first approximation image;

defining a first and a second set of loci for display of a first and a second set, respectively, of test images;

applying a first set of transformations to said approximation image to obtain a corresponding first set of plural test images, each test image in said first set of test images corresponding to a respective transformation, and no two test images in said first set of test images corresponding to the same transformation;

applying a second set of transformations to said approximation image to obtain a corresponding second set of plural test images, each test image in said second set of test images corresponding to a respective transformation, and no two test images in said second set of test images corresponding to the same transformation;

displaying said first set of test images in said loci of said first set of loci and said second set of test images in said loci of said second set of loci, each of said loci being spatially mutually exclusive of every other locus;

selecting one locus from each of said first and second sets of loci to define a first selected locus and a second selected locus, each of said selected loci corresponding to a test image from each of said sets of test images, each of said selected loci further corresponding to respective transformations;

merging said transformations to which said selected loci correspond to form a merged transformation; and applying said merged transformation to said first approximation image to yield a result image.

3. A system for obtaining a desired image, said system comprising:

means for obtaining an image source;

means for applying preliminary image processing functions to said image source to obtain a first approximation image;

means for storing said first approximation image;

means for defining a first and a second set of loci for display of a first and a second set, respectively, of test images;

means for applying a first set of transformations to said approximation image to obtain a corresponding first set of plural test images, each test image in said first set of test images corresponding to a respective transformation, and no two test images in said first set of test images corresponding to the same transformation;

means for applying a second set of transformations to said approximation image to obtain a corresponding second set of plural test images, each test image in said second set of test images corresponding to a respective transformation, and no two test images in said second set of test images corresponding to the same transformation;

means for displaying said first set of test images in said loci of said first set of loci and said second set of test images in said loci of said second set of loci, each of said loci being spatially mutually exclusive of every other locus;

means for selecting one locus from each of said first and second sets of loci to define a first selected locus and a second selected locus, each of said selected loci corresponding to a test image from each of said sets of test images, each of said selected loci further corresponding to respective transformations;

means for merging said transformations to which said selected loci correspond to form a merged transformation; and means for applying said merged transformation to said first approximation image to yield a result image.

* * * * *